United States Patent

Weakly

[15] 3,643,826
[45] Feb. 22, 1972

[54] COMBINE CLEAN GRAIN ELEVATOR

[72] Inventor: Marlin Earle Weakly, Moline, Ill.
[73] Assignee: Deere & Company, Moline, Ill.
[22] Filed: Sept. 17, 1970
[21] Appl. No.: 73,048

[52] U.S. Cl. ........................................................214/519
[51] Int. Cl. ..........................................................B63p 1/00
[58] Field of Search ....................130/27 F; 198/168; 214/519

[56] References Cited

UNITED STATES PATENTS 3,193,118  7/1965  Tweedale..........................214/519 X
3,202,154  8/1965  Viebrocu..............................130/27 F

FOREIGN PATENTS OR APPLICATIONS 736,795  6/1966  Canada...............................198/168

*Primary Examiner*—Gerald M. Forlenza
*Assistant Examiner*—Frank E. Werner
*Attorney*—H. Vincent Harsha, Harold M. Knoth, William A. Murray and John M. Nolan

[57] ABSTRACT

A hillside-type combine has a main separator body and an elevated grain tank mounted on the main separator body in a laterally overhanging disposition. A laterally extending auger-type conveyor collects the clean grain at the bottom of the body and feeds a first clean grain elevator, which extends upwardly alongside the body sidewall below the overhanging grain tank. The first clean grain elevator feeds a downwardly inclined chute which delivers the clean grain to a second elevator disposed outwardly of the first, the bottom end of the second elevator being substantially above the elevation of the bottom of the first clean grain elevator and delivering the grain upwardly along the lateral side of the grain tank to a grain tank loading system.

6 Claims, 3 Drawing Figures

INVENTOR.
M. E. WEAKLY

COMBINE CLEAN GRAIN ELEVATOR

BACKGROUND OF THE INVENTION

This invention relates to an improved clean grain elevator system and more particularly to a two-stage elevating system having particular utility on a hillside combine.

A modern combine typically has a main separator body with upright sidewalls, the threshing and grain cleaning mechanism being disposed within the body between the sidewalls. It is conventional to provide a laterally extending conveyor below the grain cleaning mechanism and along the bottom of the combine for collecting the clean grain falling through the cleaning mechanism, the clean grain collecting conveyor generally being an auger-type conveyor. Many of the newer, large capacity combines have an elevated unitary grain tank, and to provide the necessary grain tank capacity, such grain tanks generally have a substantially greater width than the main separator body, so that the grain tank overhangs the combine body on both sides. Such gain tanks are typically loaded by a loading system extending inwardly from the side of the tank and fed by a chain and paddle-type elevator, which moves the clean grain from the discharge end of the clean grain collecting auger to the grain tank loading system.

Such an arrangement is shown in U.S. Pat. No. 3,503,533, issued 31 Mar. 1970 to the assignee herein. As described in said patent, the clean grain elevator is disposed a substantial distance outwardly from the main separator body sidewall. This arrangement provides room for the conventional drive components alongside of the body sidewall and also permits the feeding of the grain tank loading system adjacent the sidewall of the grain tank. This, of course, results in a substantial lateral extension of the clean grain collecting auger at the bottom of the combine. In a normal combine, this does not present a serious problem. However, in a hillside combine, when the combine is at or near maximum tilt with the clean grain elevator on the uphill side of the machine, there is insufficient clearance between the low end of the elevator and the ground.

SUMMARY OF THE INVENTION

According to the present invention, a two-stage clean grain elevator is provided for moving the clean grain from the clean grain collecting conveyor at the bottom of the combine to the grain tank loading system at the side of the grain tank. More specifically, the first stage of the clean grain elevator is disposed inwardly from the second stage to decrease the extension of the clean grain collecting conveyor, so that the outer end of the clean grain collecting conveyor and the lower end of the clean grain elevator fed thereby are less likely to strike the ground or foreign objects disposed on the ground, particularly on a hillside-type combine when the elevator is on the uphill side of the machine.

Also according to the present invention, the first stage of the clean grain elevator discharges into a downwardly and outwardly inclined chute, which feeds the intake end of the second stage of the clean grain elevator, which is substantially above the level of the intake end of the first clean grain elevator.

An important feature of the invention resides in the arrangement of the chute between the two clean grain elevator stages, so that it discharges into the return channel of the chain and paddle-type elevator above the lower end of the second stage of the elevator, whereby the paddles in the second elevator stage engage the grain on their downward stroke rather than at the bottom of the elevator housing. As a result, the grain discharged into the second stage of the elevator is kept moving and not allowed to rest in the bottom of the elevator housing, giving a more positive feed and preventing the elevator from plugging up.

DESCRIPTION OF THE PREFERRED EMBODIMENT

Figure 1:
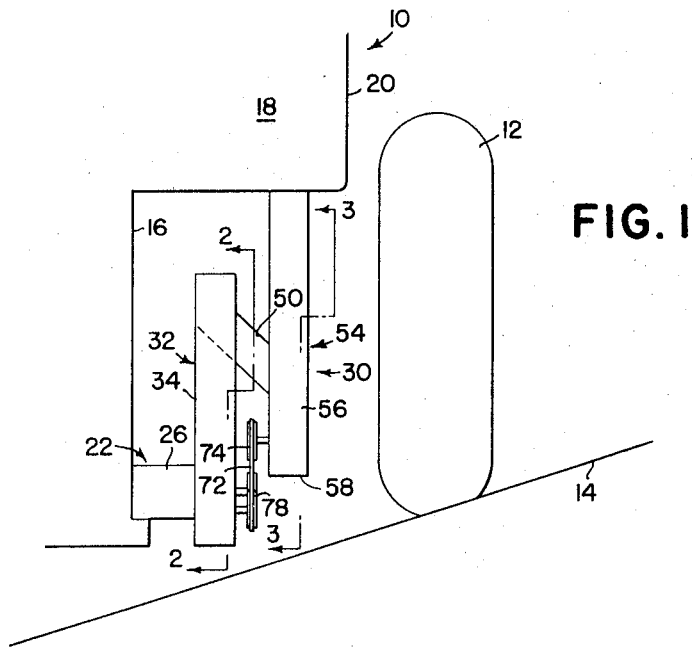
FIG. 1 is a schematic rear view of a portion of a hillside combine including the improved clean grain elevator, the combine being shown in its maximum tilt condition.
Figures 2, 3:
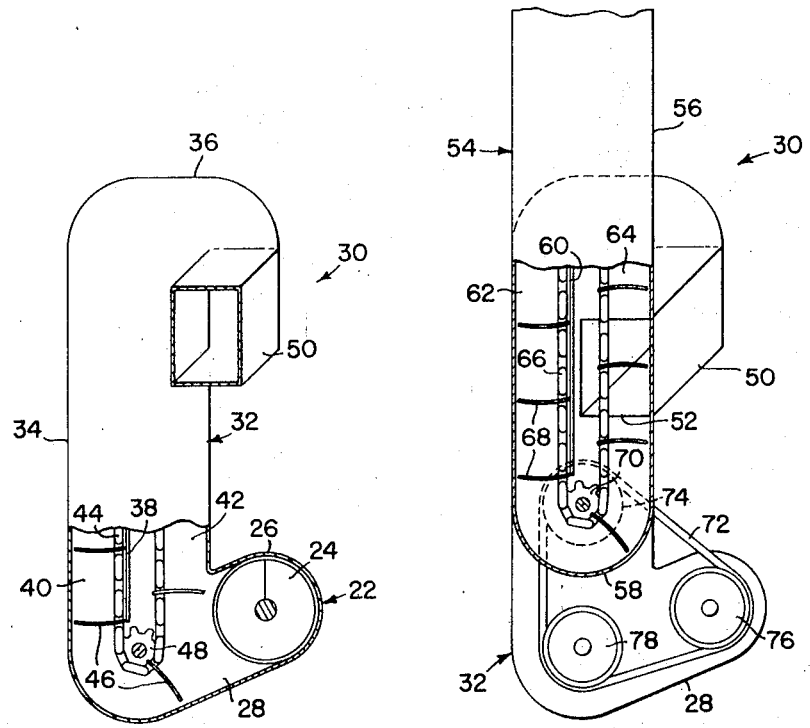
FIG. 2 is a section showing the first stage of the clean grain elevator, as viewed generally along the line 2—2 of FIG. 1.
FIG. 3 is a section view of the second stage of the clean grain elevator, as viewed generally along the line 3—3 of FIG. 1.

The invention is embodied in a hillside-type combine having a main separator body 10, only a portion of which is schematically illustrated in FIG. 1. As is conventional, the body is supported on vertically adjustable wheels through a leveling mechanism, such as shown in U.S. Pat. No. 2,904,341 issued 15 Sept. 1959 to Heitshu, so that the body is maintained in a level condition even through the combine is operating on a side slope. Only the right side drive wheel 12 is illustrated in FIG. 1 to show the relative location of the components when the combine is operating on a side slope, the ground line being identified by the numeral 14 and approximating the maximum slope conditions on which the leveling mechanism will maintain the body 10 level.

As is conventional, the separator body 10 includes a pair of upright sidewalls, only the right sidewall 16 being illustrated. An elevated grain tank 18 is supported on the body 10 and is of the general construction shown in U.S. Pat. No. 3,503,533, also assigned to assignee herein. As described in said patent, the grain tank is substantially wider than the body 10, so that it laterally overhangs the body on both sides, the grain tank sidewalls being disposed substantially outwardly of the body side walls. Only the lower portion of the right grain tank sidewall 20 is illustrated in FIG. 1.

A conventional grain separating and cleaning mechanism is disposed within the body 10, and, as is also conventional, the clean grain falls from the cleaning mechanism to a location at the bottom of the combine body, wherein it is collected in a transversely extending, auger-type clean grain collecting conveyor 22. The auger-type conveyor 22 includes an auger 24, which spans the separator body 10 and extends laterally through the combine right sidewall 16, the outer portion of the auger rotating in a cylindrical tube 26 which communicates with and terminates in a hopper 28 spaced from the right sidewall. The conveyor 22 moves the grain laterally through the combine sidewall and discharges it into the hopper 28, which feeds a clean grain elevator, indicated in its entirety by the numeral 30. The elevator elevates the grain to a grain tank loading system (not shown), such as shown in the assignee's U.S. Pat. No. 3,503,533.

The clean grain elevator 30 is a two-stage elevator and includes a first elevator stage 32. The first stage is a well known chain and paddle-type elevator and includes a hollow, elongated generally upright housing 34, having a generally rectangular cross section. The bottom of the housing communicates with and is fed by the hopper 28 and the upper discharge end 36 of the housing has a forwardly facing discharge opening. A divider member or plate 38 extends longitudinally within the housing 34 and divides the housing into an elevator or crop delivery channel 40 and a return channel 42. As is conventional, a chain 44 carries rectangular paddles 46 and rotates around a pair of sprockets 48 at the upper and lower end of the divider plate 38, so that the paddles 46 more upwardly within the grain elevating channel 40 and downwardly within the return channel 42, only the lower sprocket 48 being illustrated. Thus, as the grain is discharged from the conveyor 22 into the hopper 28, it is engaged by the paddles 46 and elevated along the channel 40 until it reaches the upper discharge end 36 of the housing 34, at which time it is projected tangentially forwardly through the discharge opening as the chain moves around the upper sprocket.

A hollow conveyor duct 50, also having a rectangular cross section, is inclined downwardly and laterally outwardly from the discharge end 36 of the first elevator housing, the duct 50 receiving the grain moving from the discharge end of the first elevator and directing it downwardly through a discharge opening 52 to a second elevator stage 54.

The second elevator stage like the first is a chain and paddle-type conveyor and includes a hollow, elongated, generally upright housing 56 having an arcuate bottom 58 and a discharge end adjacent the top of the grain tank sidewall 16 as described in said U.S. Pat. No. 3,503,533. The second elevator stage housing 56 is also separated by a divider plate 60 into elevator and return channels 62 and 64 and has a chain 66, which carries a number of rectangular paddles 68 and moves around sprockets 70 at the upper and lower end of the divider plate, the paddles, of course, conforming to the cross section of the elevator channel 62. As is apparent, the discharge opening 52 of the duct 50 communicates with the return channel 64 well above the arcuate bottom 58 of the housing 56, so that grain falling from the opening 52 is positively engaged during the downward or return run of the paddles well in advance of the bottom of the housing. This arrangement keeps the grain moving and reduces the chance of the grain accumulating in the bottom 58 of the housing 54 to plug the conveyor.

The upper sprocket of the second elevator stage 54 is driven in the conventional manner, as shown in U.S. Pat. No. 3,503,533, while the first elevator stage 32 and the conveyor 22 are driven by a belt 72 trained around a sheave 74 on the shaft of the lower sprocket 48, a sheave 76 on the shaft of the auger 24, and a sheave 78 on the shaft of the lower sprocket 48 of the first elevator stage, the sheave 74 of course being the drive sheave since the lower sprocket 70 is driven by the chain 66.

In operation, the conveyor 22 moves the grain laterally through the combine sidewall 16 and discharges it into the hopper 28, wherein it is engaged by the paddles 46 of the first clean grain elevator stage 32 and elevated along the elevator channel 40 to the upper discharge end 36 of the first elevator stage, through which it is projected forwardly and into the duct 50. The force of gravity on the grain moves the grain downwardly through the duct 50 and through discharge opening 52 into the return channel 64 of the second elevator stage, wherein it is engaged by the paddles 68 and moved along the arcuate bottom 58 of the second elevator stage housing and thence upwardly along the elevator channel 62 for discharge to the grain tank loading system. As is apparent from FIG. 1, the bottom 58 of the outer second elevator stage is substantially above the level of the bottom of the first stage so that there is sufficient clearance between the elevators and the ground during sidehill operation of the combine. As is also apparent, the above-described arrangement also reduces the lateral extension of the conveyor 22.

I claim:

1. In a combine having a main separator body with opposite upright sidewalls, a separating and cleaning mechanism within the body, a clean grain collecting conveyor extending laterally along a lower portion of the body and through one of the sidewalls for moving clean grain from the cleaning mechanism and having a discharge end exteriorly of said sidewall, an elevated grain tank mounted on the body in a laterally overhanging disposition and having opposite sides disposed outwardly of the body sidewalls, the improvement comprising: a first clean grain elevator extending upwardly adjacent to a body sidewall and having a lower intake end in grain-receiving relationship with the discharge end of the clean grain-collecting conveyor and a higher discharge end; a second clean grain elevator spaced outwardly from the first clean grain elevator and having a lower intake end and an elevated discharge end; and connecting means between the discharge end of the first clean grain elevator and the second clean grain elevator for conveying the grain from the first to the second elevator.

2. The invention defined in claim 1 wherein the connecting means between the clean grain elevators comprises a duct having an inlet communicating with the discharge end of the first clean grain elevator and an outlet communicating with the second clean grain elevator.

3. The invention defined in claim 1 wherein the elevators are chain and paddle-type elevators, each elevator including a housing with elevating and return channels substantially extending the length of the conveyor and respectively enclosing elevating and return runs of the chains and paddles.

4. The invention defined in claim 3 wherein the first elevator housing includes a discharge housing portion at the upper end of the elevator and the connecting means includes a duct having an inlet end communicating with said discharge housing portion of the first elevator and an outlet communicating with the return channel of the second elevator.

5. The invention defined in claim 3 wherein the combine is a hillside-type combine wherein the attitude of the body relative to the ground about a fore-and-aft axis is changeable during the operation of the machine on hillsides so that the clearance between the lower ends of the first and second elevators is reduced when the elevators are on the uphill side of the combine.

6. The invention defined in claim 1 wherein the entire first clean grain elevator is disposed below the overhanging portion of the grain tank.

* * * * *